US010873735B2

(12) United States Patent
Lee et al.

(10) Patent No.: US 10,873,735 B2
(45) Date of Patent: Dec. 22, 2020

(54) ELECTRONIC DEVICE CAPABLE OF IDENTIFYING AND DISPLAYING OBJECT, AND OBJECT IDENTIFYING METHOD THEREOF

(71) Applicant: CHAMP VISION DISPLAY INC., Hukou Township (TW)

(72) Inventors: Hsin-Hung Lee, Hsin-Chu (TW); Chiao-Chih Yang, Hsin-Chu (TW); Ko-Wei Chien, Hsin-Chu (TW); Ho-Kuei Chen, Hsin-Chu (TW); Shih-Kun Chiu, Hsin-Chu (TW)

(73) Assignee: CHAMP VISION DISPLAY INC., Hukou Township (TW)

( * ) Notice: Subject to any disclaimer, the term of this patent is extended or adjusted under 35 U.S.C. 154(b) by 201 days.

(21) Appl. No.: 15/392,469

(22) Filed: Dec. 28, 2016

(65) Prior Publication Data

US 2017/0195651 A1 Jul. 6, 2017

(30) Foreign Application Priority Data

Jan. 5, 2016 (TW) .............................. 105100205 A

(51) Int. Cl.
*H04N 13/156* (2018.01)
*G06K 9/00* (2006.01)
(Continued)

(52) U.S. Cl.
CPC ....... *H04N 13/156* (2018.05); *G06K 9/00771* (2013.01); *G06K 9/2027* (2013.01);
(Continued)

(58) Field of Classification Search
CPC combination set(s) only.
See application file for complete search history.

(56) References Cited

U.S. PATENT DOCUMENTS

| 5,299,971 A * | 4/1994 | Hart ................... G08B 13/1963 180/167 |
| 7,016,532 B2 | 3/2006 | Boncyk et al. |
(Continued)

FOREIGN PATENT DOCUMENTS

| CN | 2536042 Y | 2/2003 |
| CN | 202486434 U | 10/2012 |
(Continued)

*Primary Examiner* — Clifford Hilaire

(57) ABSTRACT

An electronic device, capable of identifying and displaying an object, includes an image capturing unit, a display unit and a processing unit. The image capturing unit is configured to capture the object. The display unit includes a transparent display panel and a backlight module, wherein the transparent display panel has a viewing side and a back side opposite to the viewing side, and the backlight module is disposed between the back side and the object. The processing unit is electrically connected to the image capturing unit, the transparent display panel and the backlight module, and is configured to receive an image signal captured by the image capturing unit to identify the object according to the image signal, control the transparent display panel to display information frame corresponding to an identifying result, and turn on/off the backlight module. An object identifying method for the electronic device is also provided.

16 Claims, 6 Drawing Sheets

(51) Int. Cl.
  *G06K 9/20* (2006.01)
  *G06K 9/62* (2006.01)
  *H04N 5/225* (2006.01)

(52) U.S. Cl.
  CPC ......... *G06K 9/6267* (2013.01); *H04N 5/2256* (2013.01); *H04N 5/2257* (2013.01); *G06K 2209/17* (2013.01); *H04N 2213/001* (2013.01)

(56) References Cited

U.S. PATENT DOCUMENTS

| | | | | |
|---|---|---|---|---|
| 7,043,069 B1* | 5/2006 | Heinrich | ............... | C23C 4/12 219/121.36 |
| 2003/0173876 A1* | 9/2003 | Fujii | ............... | A47F 5/0093 312/116 |
| 2003/0206275 A1* | 11/2003 | Cimini | ............... | G09F 19/18 353/28 |
| 2005/0004838 A1* | 1/2005 | Perkowski | ............... | G06Q 30/02 705/14.73 |
| 2009/0189775 A1* | 7/2009 | Lashina | ............... | G09F 27/00 340/6.11 |
| 2011/0317401 A1* | 12/2011 | Ling | ............... | G02B 6/0088 362/97.2 |
| 2012/0105424 A1 | 5/2012 | Lee et al. | | |
| 2014/0307062 A1* | 10/2014 | Rotem | ............... | H04N 13/261 348/50 |
| 2014/0333541 A1* | 11/2014 | Lee | ............... | G06F 3/04886 345/168 |
| 2014/0354690 A1 | 12/2014 | Walters et al. | | |
| 2016/0097893 A1* | 4/2016 | Sohn | ............... | G02F 1/133615 349/65 |

FOREIGN PATENT DOCUMENTS

| | | |
|---|---|---|
| CN | 102866526 A | 1/2013 |
| CN | 103425445 A | 12/2013 |
| CN | 103578400 A | 2/2014 |
| CN | 204467579 U | 7/2015 |
| JP | 2003-125904 A | 5/2003 |
| TW | 201246101 A | 11/2012 |
| TW | M491235 U | 12/2014 |

* cited by examiner

ELECTRONIC DEVICE CAPABLE OF IDENTIFYING AND DISPLAYING OBJECT, AND OBJECT IDENTIFYING METHOD THEREOF

CROSS-REFERENCE TO RELATED APPLICATION

This application claims the priority benefit of Taiwan application serial no. 105100205, filed on Jan. 5, 2016. The entirety of the above-mentioned patent application is hereby incorporated by reference herein and made a part of this specification.

FIELD OF THE INVENTION

The invention relates to an object display device, and more particularly to an electronic device capable of identifying and display object and the object identifying method using the same.

BACKGROUND OF THE INVENTION

At the mall or in the exhibition, object for sale or display are usually placed in display cabinet, for the selection or viewing. Traditional display cabinets serve only a simple display function, and information items about the displayed object are often provided in a paper beside the displayed object, and in some cases, display device will be provided in the vicinity of the displayed object to dynamically render the related information.

However, the materials of the related information to be displayed, whether written in paper or rendered on the display device, the content to be presented must be prepared in advance, and the paper or display device must be arranged and installed according to the position of the displayed object in an artificial manner. Whenever the position of the displayed object is changed, the position of paper or display device needs to be changed accordingly.

The information disclosed in this "BACKGROUND OF THE INVENTION" Section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention was acknowledged by a person of ordinary skill in the art.

SUMMARY OF THE INVENTION

The invention provides an electronic device capable of identifying and displaying an object, so that to display correlated information of the displayed object automatically.

The invention also provides an object identifying method to identify displayed object, and illustrate correlated information according to the identifying result.

Other advantages and objects of the invention may be further illustrated by the technical features broadly embodied and described as follows.

In order to achieve one or a portion of or all of the objects or other objects, an embodiment of the invention provides an electronic device capable of identifying and displaying an object. The electronic device includes an image capturing unit, a display unit, and a processing unit. The image capturing unit for capturing the object to obtain an image signal corresponding to the object. The display unit includes a transparent display panel and a backlight module, wherein the transparent display panel has a viewing side and a back side opposite to the viewing side, and the backlight module is disposed between the back side and the object. The processing unit is electrically connected to the image capturing unit, the transparent display panel, and the backlight module. The processing unit is configured to receive the image signal, so as to identify the object according to the image signal, control the transparent display panel to display information frame corresponding to an identifying result corresponding to the object, and control an on/off state of the backlight module.

In order to achieve one or a portion of or all of the objects or other objects, an embodiment of the invention further provides an object identifying method in an electronic device capable of identifying and displaying an object. The object identifying method includes steps of capturing the object via an image capturing unit to obtain an image signal; receiving the image signal via the processing unit and identifying the object according to the image signal to obtain an identifying result; and controlling the transparent display panel via the processing unit to display an information frame corresponding to the identifying result, wherein when the object is identified, display correlating information of the object on the transparent display panel, and when the object is not identified, display a manual input screen on the transparent display panel.

The electronic device capable of identifying and displaying an object according to an embodiment of the invention may not only display the object, but also identify the object according to the image signal captured by the image capturing unit, and display a correlated information frame on the transparent display panel according to the identifying result. Therefore, the correlated information may be displayed once the object is placed within the electronic device. Furthermore, while using the object identifying method to identify object, in case that the object may not be identified successfully, a manual-input screen is displayed on the transparent display panel under the control of the processing unit, so that the search job may be performed manually to display the related information of the object.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The invention will become more readily apparent to those ordinarily skilled in the art after reviewing the following detailed description and accompanying drawings, in which.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces", and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1A:
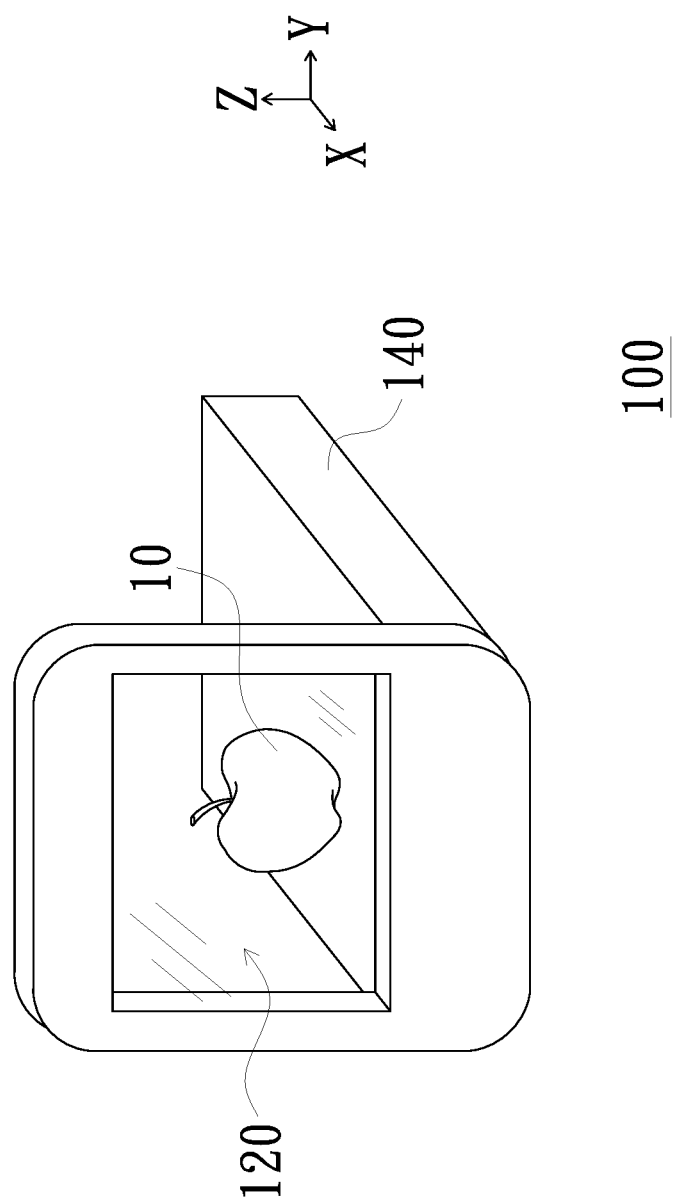
FIG. 1A is a perspective view of an electronic device for identifying and displaying objects in a status of displaying an object in accordance with an embodiment of the invention.
Figure 1B:
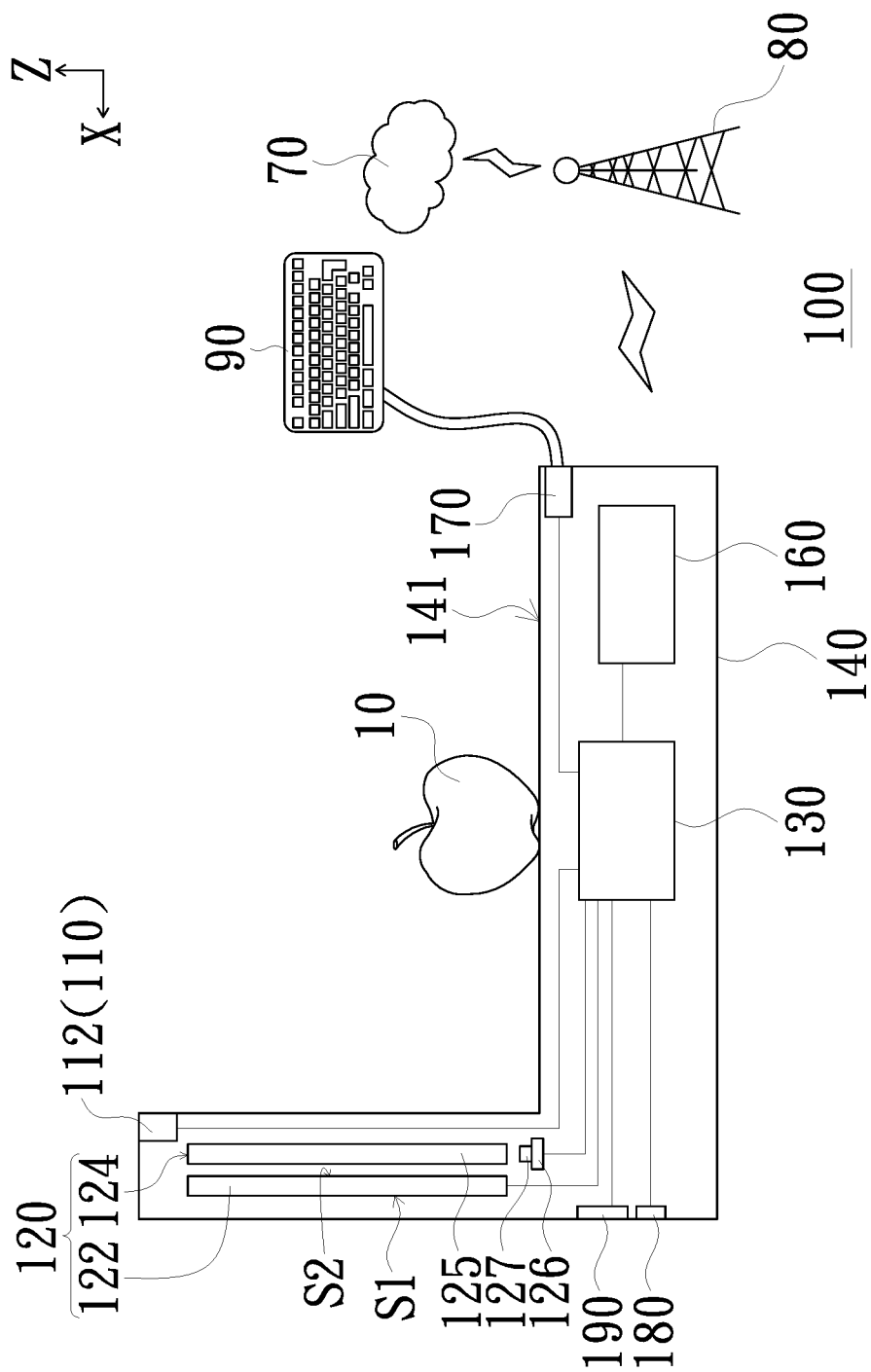
FIG. 1B is a schematic cross-sectional view illustrating the internal components of the electronic device shown in FIG. 1A in cooperated with the peripheral accessory.

FIG. 1A is a perspective view of the electronic device capable of identifying and displaying objects according to an embodiment of the invention. FIG. 1B illustrates the internal components of the electronic device shown in FIG. 1A in cooperated with the peripheral accessory. Please refer to FIGS. 1A and 1B, the electronic device 100 capable of identifying and displaying objects is configured to identify and display the object 10. The electronic device 100 includes an image capturing unit 110, a display unit 120 and a processing unit 130. The image capturing unit 110 is used for capturing the object 10 to obtain an image signal corresponding to the object. The display unit 120 includes a transparent display panel 122 and a backlight module 124, wherein the transparent display panel 122 has a viewing side S1 and a back side S2 opposite to the viewing side S1, and the backlight module 124 is disposed between the back side S1 and the object 10. The processing unit 130 is electrically connected to the image capturing unit 110, the transparent display panel 122, and the backlight module 124. The processing unit 130 is configured to receive the image signal, so as to identify the object 10 according to the image signal, and the processing unit 130 is configured to control the transparent display panel 122 to display information frame corresponding to an identifying result corresponding to the object 10, and is configured to control an on/off state of the backlight module 124.

The electronic device 100 may further include a housing 140 for placing the image capture unit 110, the display unit 120, and the processing unit 130. The housing 140 includes a platform 141 for placing the object 10 on it. The image capturing unit 110 includes, for example, at least an image capturing element 112 as illustrated in FIG. 1B. Each of the image capturing element 112 includes, for example, an image sensing element (not shown) and a lens (not shown) to focus the light reflected by the object 10 onto the image sensing element. The image sensing element may be but is not limited to a charge coupled device (CCD) or a CMOS image sensor, etc. In the other embodiment, there are multiple image capturing elements 112 disposed at different locations within the housing 140 for capturing the images of the object 10 from different viewpoints.

The transparent panel 122 may be, but is not limited to, a transmissive light valve panel such as a liquid crystal display. The backlight module 124 includes a light guide plate 125 and a light bar 126 disposed beside the light guide plate 125. The light bar 126 includes a plurality of light emitting elements 127 arranged along a predetermined direction (e.g., the direction along the Y axis as shown in FIG. 1A). The aforementioned predetermined direction may be the extending direction of the longer side of the light bar 126. The processing unit 130 is configured to control at least a portion of the light emitting elements 127 to emit light beam according to a display requirement of the transparent display panel 122. The light emitting elements 127 may be but are not limited to light emitting diodes (LEDs), laser diodes (LDs), or other point light sources.

In detail, when the backlight module 124 is in an off state (i.e. the light emitting elements 127 are not lighted), the object 10 behind the display unit 120 may be observed clearly from the viewing side S1. Otherwise, when the backlight module 124 is in an on state (i.e. the light emitting elements 127 are lighted), the contrast ratio of the transparent panel 122 is increased, the information frame displayed on the transparent panel 122 may be read clearly from the viewing side S1, but the object 10 may not to be observed as clear as the aforementioned status. Therefore, the processing unit 130 is capable of controlling the on/off state of the backlight module 124 according to the requirement of displaying. Furthermore, in an embodiment, under the control of the processing unit 130, only a portion of the light emitting elements 127 is turned on and the others are remained in the off state, so that the backlight is only provided to a local area of the transparent display panel 122. In such an embodiment, the portion of the transparent display panel 122 receiving the backlight is a high-contrast area which may used for displaying the information frame corresponding to the object 10, while the other area of the transparent display panel 122 may be correspond to the object 10. Accordingly, the object 10 and the information frame displayed on the transparent display panel 122 may be observed clearly from the viewing side S1 simultaneously.

The transparent display panel 122 may be, for example, a two-dimensional display panel. In an embodiment, the transparent display panel 122 is a stereoscopic display panel, wherein the stereoscopic display panel may be an autostereoscopic 3D display panel, or a stereoscopic glasses display panel. Different from the two-dimensional display panel, the stereoscopic display panel further includes a liquid crystal lens film or a lenticular lens film, so as to separate the image signals for both the left eye and the right eye. In the embodiment, the transparent display panel 122 is a stereoscopic display panel, and the image capturing unit 110 includes at least two image capturing elements 112 arranged as visual distance, so as to take the stereoscopic image of the object 10, and display the stereoscopic image through the stereoscopic display panel.

Figure 2:
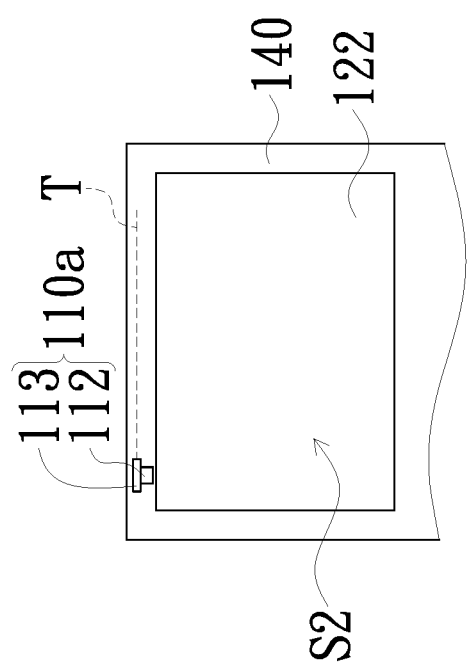
FIG. 2 is a partly enlarged schematic cross-sectional view of an electronic device in a status of displaying an object in accordance with another embodiment of the invention.

In another embodiment shown in FIG. 2, the image capturing unit 110a may include a movable element 113 and an image capturing element 112 fixed on the movable element 113. The movable element 113 is configured to move the image capturing element 112, so as to capture the image of the object 10 from different viewpoints to compose a stereoscopic image of the object 10. The movable element 113 moves along a liner track T, but the type of the moving track and the kind of the movable elements 113 are not limited in the invention. For example, the movable element 113 may be a robotic arm. By moving the image capturing element 112 through the movable element 113, a stereoscopic image of the object 10 may be captured even if there is only one image capturing element 112. The numbers of the movable element 113 and the image capturing element 112 may be varied according to various design requirements. It is noticeable that the image capturing unit 110a may also be applied within the electronic devices of other embodiments (e.g. the electronic devices shown in FIGS. 1A, 1B, 3 and 4) to achieve similar functions.

Figure 3:
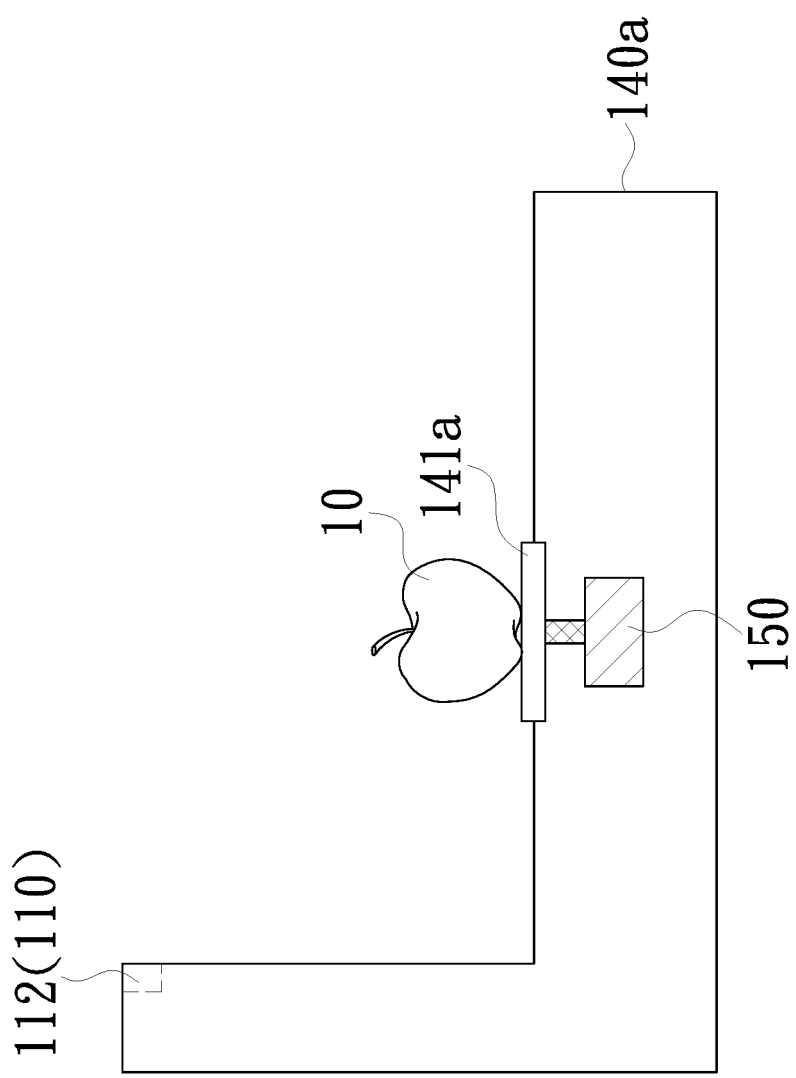
FIG. 3 is a partly enlarged schematic view of an electronic device in accordance with another embodiment of the invention.

In still another embodiment shown in FIG. 3, the electronic device capable of identifying and displaying objects further includes a transmission part 150 connected to the platform 141a of the housing 140a for driving the platform 141a to be rotated and/or moved. In other words, the transmission part 150 may drive the platform 141a to be rotated or moved, or rotated and moved, so that the object 10 on the platform 141a is rotated or moved, or rotated and moved simultaneously. Accordingly, even if the image capturing element 112 is fixed, a stereoscopic image of the object 10 may still be obtained by the operation of the transmission part 150, and the spectator may observe the object 10 from the viewing side S1 in different viewpoints. It is noticeable that the transmission part 150 may also be applied to the electronic devices of other embodiments (e.g. the electronic devices shown in FIGS. 1A, 1B, 2 and 4) to achieve similar functions.

Please refer to FIG. 1B again, apart from a processor and its peripheral elements for data operations, the processing unit 130 may further includes a database. The database stores a plurality of object information for identifying the object 10. In detail, there are large amount of object information for different objects stored in the database, and once the processing unit 130 receives the image signal captured by the image capturing unit 110, the image signal may be compared with the object information stored in the database for identifying the object 10. In one embodiment, when the object 10 cannot be identified by the object information stored in the database, the object information may be obtained from searching a cloud database in the Internet 70 for the object information relating to the object 10, so that the object 10 may be identified. In another embodiment, the database is not necessary for the processing unit 130, and the object information may be obtained from searching a cloud database in the Internet 70 for the object information relating to the object 10, so that the object 10 may be identified. For connecting to the Internet 70, the electronic device 100 further includes an Internet accessing unit 160 electrically connected to the processing unit 130. The processing unit 130 is configured to be connected to the Internet 70 via the Internet accessing unit 160, so as to search object information correlated to the object 10 for identifying the object 10. The Internet accessing unit 160 includes signal transceiver (not shown), for example, a network interface card, for receiving and transmitting signals. The Internet accessing unit 160 is capable of connecting to the network signal site 80 by wire or wireless means, and thus connecting to the Internet 70 through the network signal site 80.

The electronic device 100 may further include an input device port 170. As shown in FIG. 1B, the input device port 170 is electrically connected to the processing unit 130. The input device port 170 provides a connection to an external input device 90, such as a keyboard, a mouse, a trackball, a touch pad, a voice input device, a barcode reader, a gesture sensor, etc. In the other embodiment, an input device (not shown) is built in the electronic device 100 and electrically connected to the processing unit 130, and thus the input device port 170 is omitted. The built-in input device may be a keyboard, a mouse, a trackball, a touch pad, an voice input device, a barcode reader, a gesture sensor, etc., or be integrated with the display unit 120, i.e. the transparent display panel 122 may be a touch panel. The number and type of the input device port 170 and the built-in input device are not limited in the invention. Moreover, the input device port 170 may be a universal serial bus (USB) to connection to the external input device 90, an external storage device, or other element.

According to different design requirements, the electronic device 100 may further includes a human body sensing element 180, as shown in FIG. 1B, electrically connected to the processing unit 130, for detecting a human body (not shown) accessing to the electric device 100. The human body sensing element 180 may be, for example, an IR sensor or an image sensor, but the invention is not limited thereto. The processing 130 may control the displaying contents of the transparent display panel 122 according to the status of human body accessing. For example, when there is no human body accessing, an content for attracting a user's attention such as an advertising film relating to the object 10 may be displayed on the transparent display panel 122; when there is a human body accessing, the playing of the advertising film may be stopped, and detailed information about the object 10 may be displayed.

According to different design requirements, the electronic device 100 may further includes a voice broadcasting element 190, as shown in FIG. 1B, electrically connected to the processing element 130. The processing element 130 is configured to control the broadcasting operation of the voice broadcasting element 190 according to the identifying result corresponding to the object 10. The voice broadcasting element 190 may be but is not limited to a loudspeaker. Accordingly, the related information about the object 10 may not only be displayed on the transparent display panel 122, but also be broadcasted by the voice broadcasting element 190. Furthermore, the electronic device 100 equipped with the voice broadcasting element 190 is also capable of providing an object identification function to be assistive for visual impairment person. It is noticeable that the voice broadcasting element 190 may also be applied to the electronic devices of other embodiments (e.g. the electronic devices shown in FIGS. 2, 3 and 4) to achieve similar functions.

Figure 4:
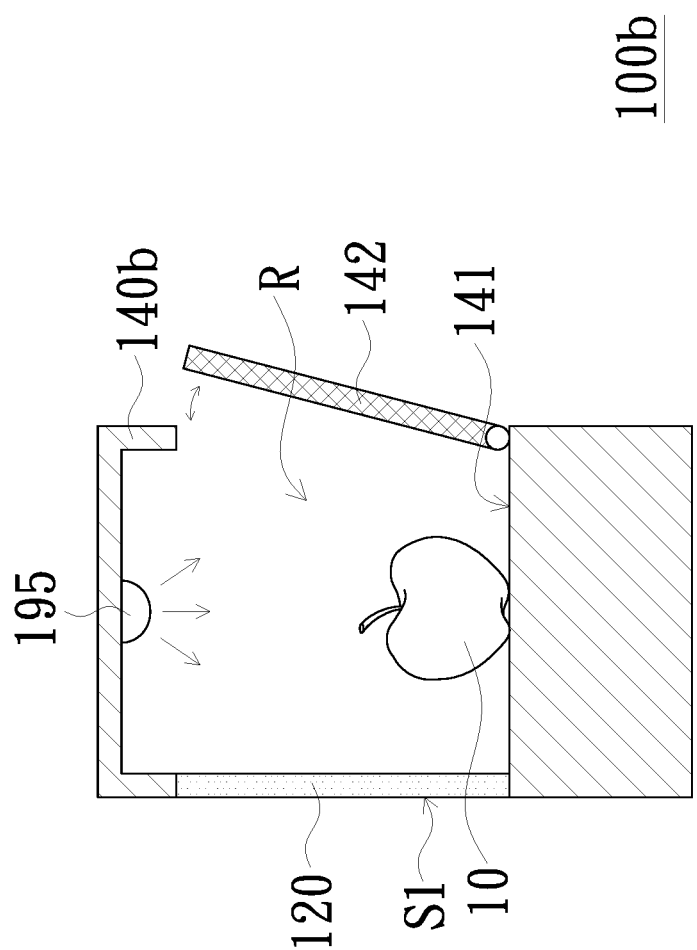
FIG. 4 is a partly enlarged schematic cross-sectional view showing an electronic device in a status of displaying an object in accordance with an embodiment of the invention.

The housings 140 and 140a are only exemplary illustrations and are not to limit the proper shape of the housing of the invention. FIG. 4 illustrates a partly cross-sectional view of another embodiment of the electronic device capable of identifying and displaying objects. As shown in FIG. 4, the electronic device 100b is similar to the electronic device 100, and the main difference is that the housing 140b is an enclosed type box having a receiving space R for receiving the object 10 within it. The housing 140b further includes a door 142 which may be opened to place the object 10 into the receiving space R. In the case that the enclosed type box is made by non-transparent material, the object 10 may be shielded from ambient light, and thus the object 10 may not be observed from the viewing side S1. Therefore, the electronic device 100b further includes a lighting device 195 fixed within the housing 140b and electrically connected to the processing unit (not shown), so that the objet 10 is capable of being illuminated under the control of the processing unit. In other words, the object 10 may be illuminated by the lighting device 195 under the control of the processing unit when needed, and in the situation that it is no need for the viewer to observe the object 10 from the viewing side S1, the lighting device 195 may be turned off under the control of the processing unit.

Figure 5:
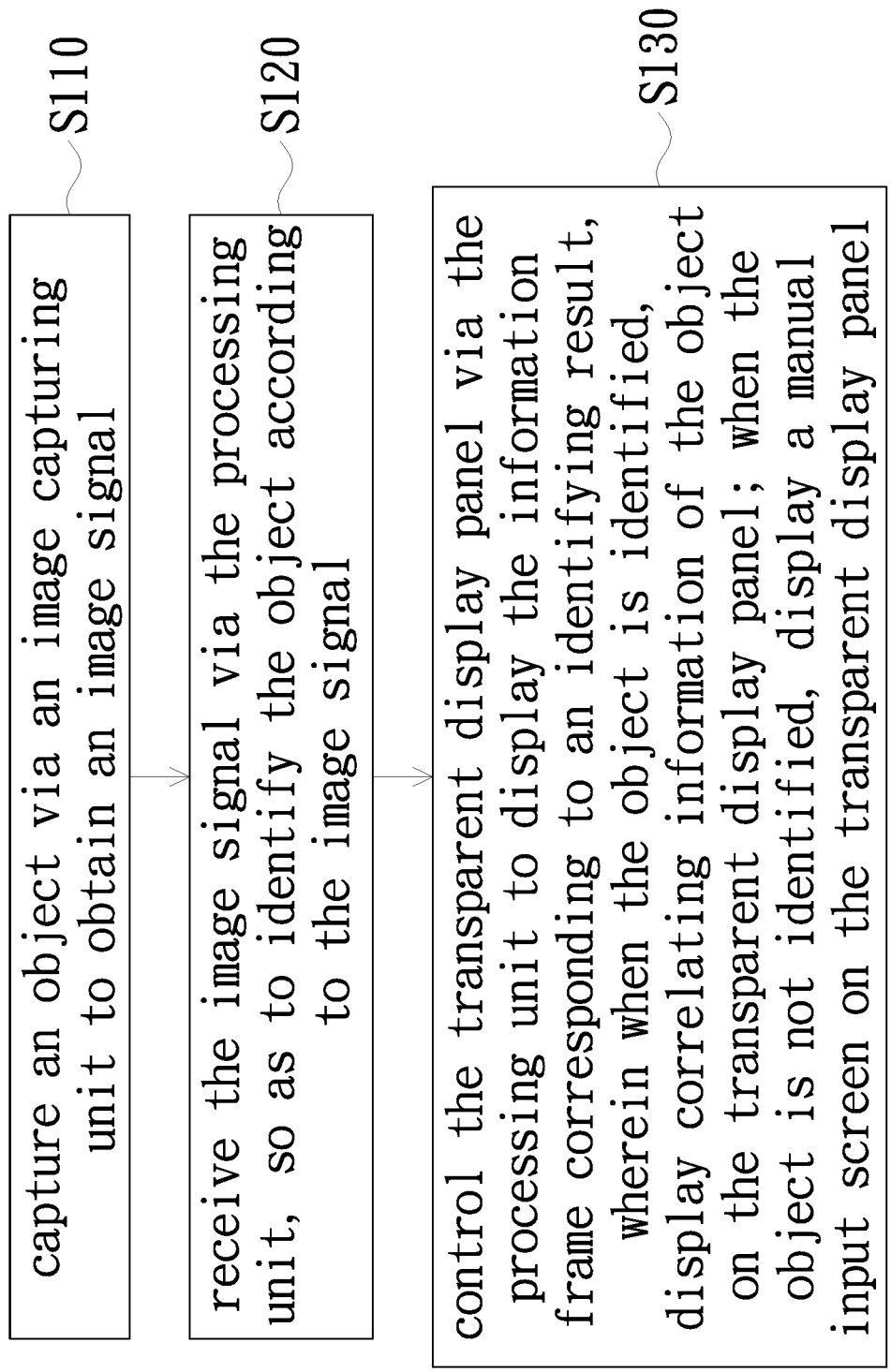
FIG. 5 is a flow chart of the object identifying method in accordance with an embodiment of the invention.

FIG. 5 illustrates a flow diagram of the object identifying method according to an embodiment of the invention. Please refer to FIGS. 1B and 5, the object identifying method of this embodiment is configured to be applied on the operations of the aforementioned electronic devices capable of identifying and displaying objects. The object identifying method includes steps of:

S110: when the object 10 is placed on the platform 141, capture the object 10 via the image capturing unit 110 to obtain the image signal representing the object 10.

S120: receive the image signal captured by the image capturing unit 110 via the processing unit 130, so as to identify the object 10 according to the image signal. In detail, the processing unit 130 is capable of searching the built-in database to find the object information. In case there is no built-in database or the object 10 may not be identified by searching the built-in database, the search job may be extended to the Internet 70. When the Internet 70 is connected, and connects to a specific cloud database to increase the speed of searching and identifying. Furthermore, the image signal is capable of being stored by the processing unit 130.

S130: control the transparent display panel 122 via the processing unit 130 to display the information frame corresponding to the identifying result. When the object 10 is successfully identified, correlating information of the object 10 is displayed on the transparent display panel 122. The correlating information may be static or dynamic information. The correlating information may be pre-edit and stored within a built-in database or a cloud database, and also may be information without pre-edit. Furthermore, when the information corresponding to the identifying result is displayed on the transparent display panel 122 under the control of the processing unit 130, the backlight module 124 may also be turned on under the control of the processing unit 130. As have been mentioned, the light emitting elements 127 of the light bar 126 of the backlight module 124 may be controlled by the processing unit 130 to be fully turned on, partly turned on, or fully turned off as desired. Moreover, in the embodiments, voice broadcasting elements 190 are equipped, voice information may be broadcasted by voice broadcasting element 190 under the control of the processing unit 130.

On the other hand, when the object 10 is not successfully identified, a manual input screen is displayed on the transparent display panel 122 under the control of the processing unit 130. The manual input screen may includes manually-inputted search fields, so that the user may input proper searching keywords via the aforementioned built-in or external input device to search related information in the built-in database or in the cloud database. In an embodiment, the manual input screen further includes manually-inputted edit fields for the user to edit the related information of the object 10 directly. The related information may be saved by the processing unit 130 within the built-in database or the cloud database after edited. In an embodiment, a search-not-found message may be display on the transparent display panel 122 after a certain searching operations have been done within the built-in database or in the cloud database.

To sum up, the electronic device capable of identifying and displaying objects according to embodiments of the invention have at least one of the following advantages. The electronic device capable of identifying and displaying objects according to embodiments of the invention are capable of displaying an object, indentifying the object by the processing unit according to the image signal captured by the image capturing unit, and displaying corresponding information frame on the transparent display panel according to the identifying result. Accordingly, the object is placed within the electronic device, and the related information of the object is found and displayed automatically. Furthermore, the electronic device capable of identifying and displaying objects is capable of being applied in various application fields, for example, (1) display cabinets: antiques or quality goods, etc., may be placed on the platform and be displayed together with edited related information. For example, when the electric device is applied within the department store, related information of the goods is displayed together with advertising videos. In such a situation, the display unit may be switched to a high contrast mode so that the video may be displayed clearly; (2) assistive devices for visually impaired person: the voice broadcasting unit may assist the blind to identify objects; (3) teaching aids for kids: children may place objects within the electronic device to identify the objects, and related information such as object names, colors, shapes etc. is provided by video or voices after the objects are identified, so as to help children to know various objects. Compare with conventional voice-visual teaching-aids, children may more direct linkages between the objects and its related information by the transparent display panel of the electronic device; (4) smart home appliances: may be operated in cooperated with refrigerators, etc. For example, when the electronic device is a refrigerator, various foods stored within the refrigerator may be identified and the information such as nutrition constituent, calories may be displayed on the transparent display panel for the reference of diet or nutrition adjustment, or provide recipes accordingly, . . . etc.

Moreover, in the object identifying method according to an embodiment of the invention, when the identification of the object is failed, the processing unit controls the transparent display panel to display a manual input screen, so that the user may input proper searching keywords and the related information of the object may be displayed on the transparent display panel.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first stop part, the second stop part, the first ring part and the second ring part are only used for distinguishing various elements and do not limit the number of the elements.

What is claimed is:

1. An electronic device capable of identifying and displaying an object, comprising:
    an image capturing unit, for capturing the object to obtain an image signal of the object, wherein the image capturing unit comprises an image sensing element and a lens to focus the light reflected by the object onto the image sensing element;
    a display unit, comprising a transparent display panel and a backlight module, the transparent display panel having a viewing side and a back side opposite to the viewing side, and the backlight module disposed between the back side and the object, wherein the backlight module comprises a light guide plate and a light bar disposed beside the light guide plate, wherein the light guide plate and the image capturing unit are separately arranged;
    a processing unit, electrically connected to the image capturing unit, the transparent display panel, and the backlight module, wherein the processing unit is configured to receive the image signal of the object to identify the object, control the transparent display panel to display a correlated information frame correlated to the object corresponding to an identifying result corresponding to the object, and control an on/off state of the backlight module, wherein when the backlight module is in an on state, the backlight module is lighted, the correlated information frame correlated to the object displayed on the transparent panel may be read clearly from the viewing side, but the object may not to be observed clear; and
    a housing, comprising a platform for placing the object, wherein the image capturing unit is disposed within the housing without combining with the display unit, and the image capturing unit is placed at a top position of the display unit.

2. The electronic device according to claim 1, wherein the light bar comprises a plurality of light emitting elements arranged along a predetermined direction, and the processing unit is configured to control at least a portion of the plurality of light emitting elements to emit light beam according to a display requirement of the transparent display panel.

3. The electronic device according to claim 1, wherein the image capturing unit comprises at least an image capturing element.

4. The electronic device according to claim 1, wherein the image capturing unit comprises a movable element and an image capturing element fixed on the movable element, wherein the movable element is configured to move the image capturing element.

5. The electronic device according to claim 1, wherein the transparent display panel is a stereoscopic display panel.

6. The electronic device according to claim 1, further comprising an input device or an input device port electrically connected to the processing unit.

7. The electronic device according to claim 1, wherein the processing unit comprises a database, the database stores a plurality of object information for identifying the object.

8. The electronic device according to claim 1, further comprising an Internet accessing unit electrically connected to the processing unit, wherein the processing unit is configured to be connected to Internet via the Internet accessing unit, and search object information correlated to the object for identifying the object.

9. The electronic device according to claim 1, further comprising a human body sensing element electrically connected to the processing unit, wherein the human body sensing element is configured to detect a human body accessing to the electric device.

10. The electronic device according to claim 1, further comprising a voice broadcasting element electrically connected to the processing element, wherein the processing unit is configured to control the broadcasting operation of the voice broadcasting element according to the identifying result corresponding to the object.

11. The electronic device according to claim 1, further comprising a transmission part connected to the platform for driving the platform to be rotated or moved.

12. The electronic device according to claim 1, wherein the housing is an enclosed type box having a receiving space for receiving the object, and the electronic device further comprises a lighting device fixed within the housing and electrically connected to the processing unit, and the processing unit is configured to control the lighting device to light up the object.

13. An object identifying method in an electronic device capable of identifying and displaying an object, wherein the electronic device capable of identifying and displaying an object comprises a transparent display panel and a backlight module, the object identifying method comprising steps of:
    capturing the object via an image capturing unit to obtain an image signal of the object, wherein the image capturing unit comprises an image sensing element and a lens to focus the light reflected by the object onto the image sensing element, the backlight module comprises a light guide plate and a light bar disposed beside the light guide plate, wherein the light guide plate and the image capturing unit are separately arranged, wherein the object is placed on a platform of a housing, the image capturing unit is placed at a top position of the display panel, and the image capturing unit is disposed within the housing without combining with the display panel;

receiving the image signal of the object via the processing unit and identifying the object to obtain an identifying result; and controlling the transparent display panel via the processing unit to display information frame corresponding to the identifying result, wherein when the object is identified, displaying a correlated information frame correlated to the object on the transparent display panel and controlling an on/off state of the backlight module, wherein when the backlight module is in an on state, the backlight module is lighted, the correlated information frame correlated to the object displayed on the transparent panel may be read clearly from the viewing side, but the object may not to be observed clear, and when the object is not identified, displaying a manual input screen on the transparent display panel.

14. The object identifying method according to claim 13, wherein when the processing unit controls the transparent display panel to display the information frame according to the identifying result, the processing unit further controls the backlight module to be in an on state.

15. The object identifying method according to claim 13, wherein the manual input screen comprises at least one of a manually-inputted search field and a manually-inputted edit filed.

16. The object identifying method according to claim 13, wherein the processing unit controls the image signal of the object to be stored after receiving the image signal of the object.

* * * * *